United States Patent [19]

Smith, Jr. et al.

[11] Patent Number: 5,774,827
[45] Date of Patent: Jun. 30, 1998

[54] COMMUTER ROUTE SELECTION SYSTEM

[75] Inventors: Bernard C. Smith, Jr., Crystal Lake, Ill.; Jeanne A. Shands, Duluth, Ga.

[73] Assignee: Motorola Inc., Schaumburg, Ill.

[21] Appl. No.: 627,307

[22] Filed: Apr. 3, 1996

[51] Int. Cl.$^6$ .................................................. G06F 165/00
[52] U.S. Cl. .......................... 701/209; 701/202; 701/210; 340/990; 340/995
[58] Field of Search ................................ 364/443, 444.1, 364/444.2, 449.1, 449.2, 449.3, 449.4, 449.5, 449.7, 436; 340/988, 990, 995; 73/178 R; 701/200, 201, 202, 207–211, 213, 117

[56] References Cited

U.S. PATENT DOCUMENTS

| | | | |
|---|---|---|---|
| 4,954,958 | 9/1990 | Savage et al. | 364/444.2 |
| 5,172,321 | 12/1992 | Ghaem et al. | 364/444.2 |
| 5,220,507 | 6/1993 | Kirson | 364/449.4 |
| 5,365,449 | 11/1994 | Kashiwazaki | 364/449.7 |
| 5,369,588 | 11/1994 | Hayami et al. | 364/449.3 |
| 5,483,454 | 1/1996 | Lewiner et al. | 364/443 |
| 5,523,950 | 6/1996 | Peterson | 364/436 |
| 5,568,390 | 10/1996 | Hirota et al. | 364/444.1 |
| 5,610,821 | 3/1997 | Gazis et al. | 364/444.2 |

OTHER PUBLICATIONS

"Pactel Paging Tests Information Services, but Channel Crowding is Potential Problem" Mobile Data Report, Jun. 29, 1992.

Primary Examiner—Gary Chin
Attorney, Agent, or Firm—Michael L. Smith

[57] ABSTRACT

A commuter route selection system (10) includes a portable device (12) for receiving a travel time for at least one preselected commuter route and disseminating the travel time to a user and a central facility (14) for storing the at least one preselected commuter route and for obtaining current traffic information for the preselected commuter route. The central facility (14) transmits a current travel time for the preselected commuter route to the portable device (12).

10 Claims, 1 Drawing Sheet

COMMUTER ROUTE SELECTION SYSTEM

FIELD OF THE INVENTION

This invention is generally directed to the field of route guidance systems, and specifically for route guidance systems using a central facility to transmit information to a plurality of users.

BACKGROUND OF THE INVENTION

Traffic in large metropolitan areas often becomes congested as a result of conditions such as accidents, construction, and simply from an excessive number of cars on the roads. Commuters, in order to reduce their daily commuting time and to avoid as many major delays listen to traffic reports on local radio and television stations or subscribe to expensive route guidance systems that cost thousands of dollars.

The main drawback to the prior art systems is that they provide more information than the commuter needs or they provide more capability than the commuter needs or most likely cares to pay for. That is to say a commuter's reliance on radio or TV reports is suspect at best because the commuter cannot control when the traffic information is broadcast or even if relevant traffic information will be broadcast. In addition, when the traffic information is given a particular commuter is only interested in a small part of the traffic information broadcast and therefore the commuter must filter out all the non-relevant information. If a commuter has a sophisticated route guidance system where the commuter has a positioning system as well as a map database in a car the significant amount of investment in the equipment and services makes the wide use of these systems highly unlikely.

Commuters in these areas daily travel between the same fixed origins and destinations. There are normally several different routes that the commuter knows of that can be taken between the origins and destinations. Therefore, there is a need for a system that can relay only the traffic information that the commuter needs to allow the commuter to commute most effectively between an origin and destination.

BRIEF DESCRIPTION OF THE DRAWINGS

For a more complete understanding of the present invention reference should be made to the drawings, where.

DETAILED DESCRIPTION OF A PREFERRED EMBODIMENT

Figure 1:
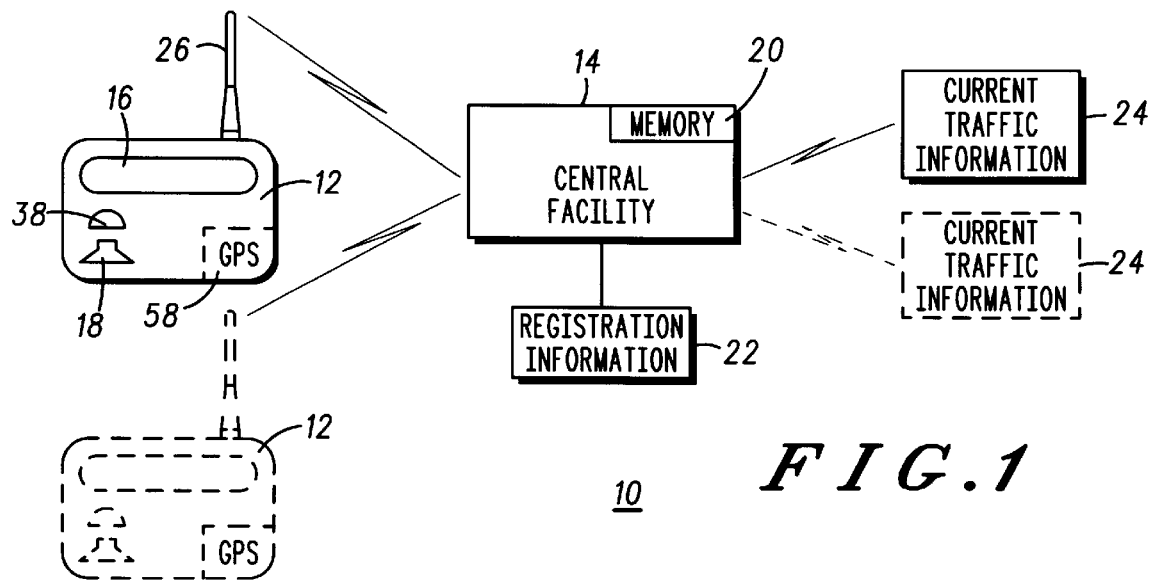
FIG. 1 is a block diagram of a preferred system in accordance with the present invention.

A commuter route selection system 10, in accordance with the present invention is shown in FIG. 1. The system 10 includes a portable device 12 for receiving a travel time for at least one preselected commuter route from a central facility 14 and disseminating the travel time to a user via a display 16 or an audio source 18 for broadcasting the travel time to the user. The central facility 14 stores the preselected commuter route in a memory 20. The preselected commuter route(s) is obtained from the user's registration information at block 22. The central facility 14 also obtains current traffic information for the preselected commuter route from various current traffic information sources 24. The traffic information sources 24 preferably include local police authorities, tollway authorities, spotters, or sensors deployed on the road ways to detect traffic flow.

The central facility 14 then transmits a current travel time for the preselected commuter route to the portable device 12, via an antenna 26, wireline, or other communications means, based on the current traffic information received from the sources 24. The display 16 is for displaying the current travel time for at least one preselected commuter route. The user, by using this system 10, can obtain current traffic commuting times for each of a preselected number of possible commuter routes, in order to make the best possible commuting decision. The system 10 increases the efficiency and accuracy of the dissemination of current traffic information because the user receives only the traffic information relevant to him and is not forced to filter out a significant amount of unnecessary data, such as is necessary in TV or radio broadcasts. As indicated by the phantom drawing of portable device 12, a plurality of portable devices 12 are preferably serviced by a single central facility 14 such that each user receives only the traffic information that is relevant to the user's preselected commuter routes.

Figure 2:
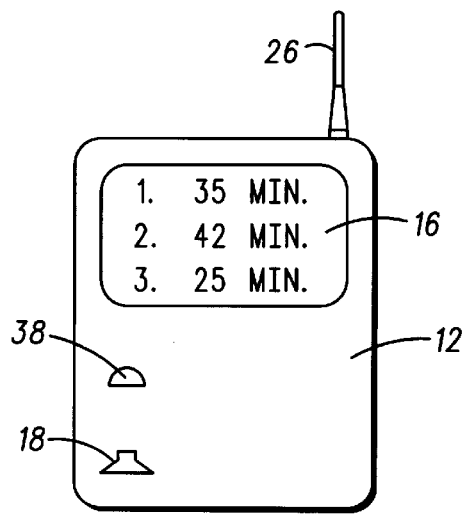
FIG. 2 is an illustration of a typical message displayed by the system of FIG. 1 to a user.

As those skilled in the art will appreciate, the portable device 12 may receive and disseminate a travel time for each of a plurality of preselected commuter routes. In such a case, the central facility 14 preferably stores each of the plurality of preselected commuter routes in the memory 20 and obtains current traffic information for each of the plurality of preselected commuter routes from the sources 24. FIG. 2 shows a portable device 12, which could be a pager, a personal digital assistant, a portable computer, cellular phone, or other similar device, wherein the display 16 shows each of three preselected routes for a user and corresponding estimated travel times for each of the three preselected routes. Obviously, each user may have more or fewer routes depending on the possible number of routes there are from the same origin to the same destination. Each of the three routes, in the present example, preferably is initially stored in the central facility 14 based on the registration information provided at block 22. As shown, each preselected commuter route is preferably coded such as the disclosed 1, 2, and 3. By coding each preselected commuter route with a number or similar short-hand code, the amount of information needed to be transferred from the central facility 14 to the portable device 12 is minimized. This coding of the preselected commuter routes should not result in any inconvenience to the user because the user already knows the routes and provided these as part of the registration information of block 22.

Figure 3:
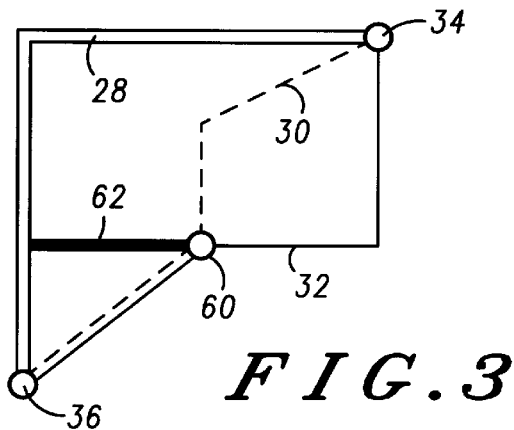
FIG. 3 is a graphical illustration of an example of possible commuter routes in accordance with the present invention.

The three possible routes are shown in FIG. 3 at 28, 30, and 32. As shown, each route is from the same origin 34 to the same destination 36. Each route 28–32 may represent each of a user's daily commuting options from home to work. By selecting each of the three routes 28–32 as a preselected commuter route the user will receive, from the central facility 14 through the portable device 12, current travel times for each route 28–32 for making a decision as to which route to travel that day. In the example of FIG. 2, where 1 represents route 28, 2 represents route 30, and 3 represents route 32 the user would choose 3 or route 32 because it has the shortest current travel time of the three possible routes. As those skilled in the art will appreciate, central facility 14 can be programmed to send each user the preselected commuter route information at a particular time each day or, if portable device 12 has two-way communications capability, in response to a request of the user. This request could be made by the user such as through a call button 38 as shown in FIGS. 1 and 2. At the end of the work day the preselected commuter routes can be automatically reversed by the central facility 14 and current travel times from work to home can be transmitted to the portable device 12.

Figure 4:
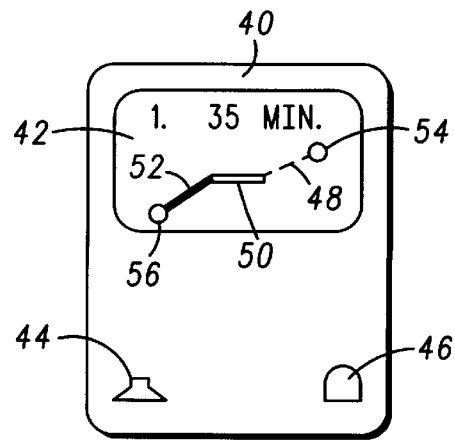
FIG. 4 is an illustration of another possible message to be displayed by the system of FIG. 1 to a user.

FIG. 4 discloses an alternate portable device 40 that includes a display 42, an audio source 44, and a call button 46. The device 40 differs from device 12 only in that display 42 has at least limited graphics capability, as shown. Preferably, display 42 will display a coded commuter route with a current travel time, as described above in connection with display 16. Additionally, display 42 preferably displays a graphic representation, including a plurality of route segments 48, 50, and 52 from an origin 54 to a destination 56, of at least one preselected commuter route received from the central facility 14 and wherein each route segment 48–52 is coded to indicate a commute time. For instance the example of FIG. 4 may indicate that the commute time for dashed segment 48 is below normal, the commute time for double-lined segment 50 is normal, and the commute time for solid line 52 is above normal. In this way more information is transmitted to the user than with device 12 that the user may use to choose an alternate route known by him that is different from any preselected commuter route stored in central facility 14. Those skilled in the art will realize that the route segments 48–52 may be coded in other ways such as by various colors or with blinking segments or similar methods. In addition, it is noted that any commuter route graphically displayed does not have to be to scale because the user already will be familiar with the commuter route and will not need to rely on the graphical representation for guidance.

In an alternate embodiment, the portable device 12 further include a global positioning system (GPS) unit 58 for transmitting a present position of the portable device 12 to the central facility 14 such that the central facility 14 uses each present position to calculate at least a portion of the current travel information. That is to say each portable device 12 with a GPS unit 58 acts as a probe in the traffic flow for central facility 14. By matching multiple positions of the portable device 12 with known positions on the preselected route and measuring the time between two consecutive matched positions central facility 14 can obtain up-to-the-minute traffic information to be used in broadcasting future travel times to other users.

In the case where portable device 12 includes GPS unit 58 the central facility 14 can determine periodic positions of the portable device 12 and therefore central facility 14 would have the ability to switch the user to a new route if current traffic conditions on the user's present route deteriorate sufficiently. For example, if the user is traveling on route 32 of FIG. 3 and an accident occurs between intersection 60 and destination 36 before the user gets to intersection 60 central facility 14 might inform the user to travel along segment 62 until route 28 to reach the user's destination 36. In this way central facility 14 can continuously update the portable device 12 as to the best possible commuter route.

In conclusion, this system 10 allows a user to efficiently and cheaply receive commuting times for known commuting routes automatically or upon demand. The present invention advances the art in that it allows a user to get current travel information that is specifically tailored to that user without the need for the user to buy expensive route guidance equipment.

What is claimed is:

1. A commuter route selection system comprising:
   a portable device for receiving a travel time for at least one preselected commuter route and disseminating the travel time to a user; and
   a central facility for storing the at least one preselected commuter route and for obtaining current traffic information for the at least one preselected commuter route, wherein the central facility transmits a current travel time for the at least one preselected commuter route to the portable device.

2. The system of claim 1, wherein the portable device receives and disseminates a travel time for each of a plurality of preselected commuter routes and wherein the central facility stores each of the plurality of preselected commuter routes and obtains current traffic information for each of the plurality of preselected commuter routes.

3. The system of claim 1, wherein the portable device includes a display for displaying the current travel time for the at least one preselected commuter route.

4. The system of claim 3, wherein the display further displays a representation, including a plurality of route segments, of the at least one preselected commuter route received from the central facility and wherein the each route segment is coded to indicate a commute time.

5. The system of claim 1, wherein the portable device includes an audio output source for broadcasting the travel time to the user.

6. The system of claim 1, wherein there are a plurality of portable devices each receiving a current travel time for each of a plurality of preselected commuter routes from the central facility.

7. The system of claim 1, wherein the portable device includes a global positioning system unit for transmitting a present position of the portable device to the central facility such that the central facility uses each present position to calculate at least a portion of the current travel information.

8. The system of claim 1, wherein the portable device further includes a user interface for the user to input a request for the current travel time and a transmitter for transmitting the request to the central facility and wherein the central facility transmits the current travel time upon receiving the request.

9. A commuter route selection system comprising:
   a central facility for storing a plurality of preselected commuter routes for each of a plurality of users and for obtaining current traffic information for each preselected commuter route;
   a plurality of portable devices wherein each portable device is designated for a particular user for receiving a current travel time for each preselected commuter route for the particular user and disseminating the current travel time to the particular user; and
   wherein the central facility transmits the current travel time to one of the plurality of portable devices in response to a request from the portable device.

10. A commuter route selection system comprising:
    a central facility for storing a plurality of preselected commuter routes for each of a plurality of users and for obtaining current traffic information for each preselected commuter route;
    a plurality of portable devices wherein each portable device is designated for a particular user for receiving a current travel time for each preselected commuter route for the particular user and disseminating the current travel time to the particular user;

wherein the central facility transmits the current travel time to one of the plurality of portable devices in response to a request from the portable device; and wherein each portable device includes a global positioning system unit for transmitting a present location to the central facility and wherein the central facility uses each present location for determining at least a portion of the current traffic information.

* * * * *